(12) United States Patent
Nochi et al.

(10) Patent No.: US 8,202,481 B2
(45) Date of Patent: Jun. 19, 2012

(54) EXHAUST GAS TREATMENT CATALYST AND EXHAUST GAS TREATMENT SYSTEM

(75) Inventors: Katsumi Nochi, Hiroshima (JP); Yoshiaki Obayashi, Hiroshima (JP); Akira Hattori, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 409 days.

(21) Appl. No.: 12/523,770

(22) PCT Filed: Aug. 7, 2008

(86) PCT No.: PCT/JP2008/064203
§ 371 (c)(1),
(2), (4) Date: Jul. 20, 2009

(87) PCT Pub. No.: WO2009/025185
PCT Pub. Date: Feb. 26, 2009

(65) Prior Publication Data
US 2010/0080737 A1    Apr. 1, 2010

(30) Foreign Application Priority Data

Aug. 22, 2007 (JP) ................................ 2007-215818

(51) Int. Cl.
*B01D 50/00* (2006.01)
(52) U.S. Cl. ........................................ 422/171; 422/177
(58) Field of Classification Search .................. 422/171, 422/177, 180
See application file for complete search history.

(56) References Cited

U.S. PATENT DOCUMENTS

| | | | |
|---|---|---|---|
| 5,430,230 A | 7/1995 | Mitsui et al. | |
| 2006/0182676 A1 | 8/2006 | Tran et al. | |
| 2007/0110643 A1 | 5/2007 | Sobolevskiy et al. | |

FOREIGN PATENT DOCUMENTS

| | | |
|---|---|---|
| EP | 0544282 A1 | 6/1993 |
| EP | 0694329 A2 | 1/1996 |
| EP | 1690586 A1 | 8/2006 |
| JP | 02-191527 A | 7/1990 |
| JP | 07-016462 A | 1/1995 |
| JP | 07-213903 A | 8/1995 |
| JP | 3219613 B2 | 10/2001 |
| JP | 3321190 B2 | 9/2002 |
| JP | 3321191 B2 | 9/2002 |
| JP | 3389005 B2 | 3/2003 |

OTHER PUBLICATIONS

Supplementary European Search Report dated Jul. 5, 2011, issued in corresponding European Patent Application No. 08827686.0.
International Search Report of PCT/JP2008/064203, Mailing Date of Sep. 22, 2008.
Canadian Office Action dated Mar. 8, 2011, issued in corresponding Canadian Patent Application No. 2,677,060.

*Primary Examiner* — Tom Duong
(74) *Attorney, Agent, or Firm* — Westerman, Hattori, Daniels & Adrian, LLP

(57) ABSTRACT

Provided are an exhaust gas treatment catalyst capable of reducing ammonia leakage rate while keeping a sufficient $NO_x$ removal efficiency, said catalyst comprising a coating layer and a catalyst base material, wherein said coating layer has a decreased thickness relative to that of a catalyst base material; and an exhaust gas treatment system using the same. In the exhaust gas treatment catalyst for catalytically removing nitrogen oxides from an exhaust gas by using ammonia as a reducing agent and simultaneously decomposing and removing unreacted ammonia, a coating layer comprising platinum supported on titania is formed on a surface of a porous catalyst base material comprising titania and at least one compound selected from oxides of vanadium (V), oxides of tungsten (W) and oxides of molybdenum (Mo).

16 Claims, No Drawings

EXHAUST GAS TREATMENT CATALYST AND EXHAUST GAS TREATMENT SYSTEM

TECHNICAL FIELD

The present invention relates to an exhaust gas treatment catalyst and an exhaust gas treatment system.

BACKGROUND ART

In order to denitrate combustion exhaust gas, ammonia ($NH_3$) is used as a reducing agent for decomposing nitrogen oxides ($NO_x$) into nitrogen ($N_2$) and water vapor ($H_2O$). In this denitration reaction, a $DeNO_x$ (denitration) catalyst is used in order to improve the reaction rate and reaction efficiency. For improving the decomposition rate of $NO_x$, it is only necessary to improve a $NH_3/NO_x$ molar ratio when $NH_3$ is added. When the $NH_3/NO_x$ molar ratio is increased excessively, however, unreacted ammonia may be mixed into an exhaust gas. The resulting exhaust gas, when released in the atmosphere, may possibly cause secondary pollution or the like due to leaked ammonia.

Under such a situation, an exhaust gas purifying catalyst having a catalyst layer for the oxidation of unreacted ammonia is known as is disclosed in JP3436567 B.

Such an exhaust gas purifying catalyst comprises a $DeNO_x$ catalyst layer as thick as approximately 0.5 mm formed using a $DeNO_x$ catalyst slurry. This layer is essential to assure denitration reaction. Thickening of the $DeNO_x$ catalyst layer however increases a pressure loss so that the operation efficiency of a plant deteriorates. Another reason for thickening the $DeNO_x$ catalyst layer is that the catalyst carrier layer cannot be used as an exhaust gas purifying catalyst.

DISCLOSURE OF THE INVENTION

Problem to be Solved by the Invention

In view of the above situation, the present invention has been made. An object of the present invention is to provide an exhaust gas treatment catalyst and an exhaust gas treatment system capable of reducing ammonia leakage rate while keeping a sufficient $NO_x$ removal efficiency, comprising a catalyst base material and a coating layer, wherein said coating layer has a decreased thickness relative to that of the catalyst base material.

Means for Solving the Problem

To achieve the above object, the present invention may be characterized by an exhaust gas treatment catalyst capable of catalytically removing nitrogen oxides from an exhaust gas by using ammonia as a reducing agent while decomposing and removing unreacted ammonia, the catalyst comprising: a porous catalyst base material comprising titania and at least one compound selected from the group consisting of oxides of vanadium (V), oxides of tungsten (W) and oxides of molybdenum (Mo); and a coating layer formed at a surface of the porous catalyst base material, said coating layer comprising platinum supported on titania.

In one aspect, the present invention may be an exhaust gas treatment catalyst capable of catalytically removing nitrogen oxides from an exhaust gas by use of ammonia as a reducing agent while decomposing and removing unreacted ammonia, which is obtained by mixing a first catalyst slurry mixture comprising the platinum supported on titania with a second catalyst slurry prepared from titania and at least one compound selected from oxides of vanadium (V), oxides of tungsten (W) and oxides of molybdenum (Mo) to form a slurry mixture; and applying the slurry mixture to the surface of the porous catalyst base material.

It is preferred that the coating layer may comprise platinum in an amount of 0.05 to 0.1 wt. % based on a total amount of the titania and platinum (Pt) comprised by the coating layer.

In the exhaust gas treatment catalyst according to the present invention, the thickness of the coating layer may be preferably from 100 to 300 µm.

In one embodiment of the exhaust gas treatment catalyst according to the present invention, the platinum in the coating layer may be isolated from the oxides of vanadium.

In another aspect, the present invention may be characterized by an exhaust gas treatment system capable of catalytically removing nitrogen oxides from an exhaust gas by use of ammonia as a reducing agent while decomposing and removing unreacted ammonia, wherein a $DeNO_x$ catalyst is placed on a side upstream of a gas flow and the exhaust gas treatment catalyst of the present invention is placed downstream of the $DeNO_x$ catalyst.

Effect of the Invention

The present invention provides an exhaust gas treatment catalyst and an exhaust gas treatment system having a coating layer decreased in thickness relative to that of a catalyst base material and having a reduced ammonia leakage rate while keeping a sufficient $NO_x$ removal efficiency.

DETAILED DESCRIPTION OF THE INVENTION

The exhaust gas treatment catalyst and the exhaust gas treatment system according to the present invention will next be described more specifically with reference to their embodiments.

Porous Catalyst Base Material

The exhaust gas treatment catalyst according to the present invention uses a porous catalyst base material as a base material. The porous catalyst base material is preferably a porous honeycomb catalyst base material.

Specifically, the porous catalyst base material is formed using, as raw materials, titania and at least one compound selected from oxides of vanadium (V), oxides of tungsten (W) and oxides of molybdenum (Mo).

Typically, the raw materials are mixed preferably at a V/W/Ti atomic ratio of (from 0.1 to 0.6)/(from 3 to 9)/(from 70 to 80) or at a V/Mo/Ti atomic ratio of (from 0.1 to 0.6)/(from 3 to 9)/(from 70 to 80).

The base material containing a $DeNO_x$ catalyst component is prepared, for example, by the following steps of: adding aqueous ammonia to a metatitanic acid slurry; adding a predetermined amount of ammonium paratungstate powder; kneading the resulting mixture; drying and calcining the kneaded mass to obtain a catalyst powder; putting the resulting catalyst powder and, if necessary, a molding auxiliary in a kneader; kneading the resulting mixture together with an adequate amount of water; extruding the resulting mass; and drying and then calcining the extrudate. The base material thus prepared is preferably adjusted to have a pore volume of from 0.25 to 0.40 g/cc.

The porous catalyst base material serves as a $DeNO_x$ catalyst for decomposing both nitrogen oxides ($NO_x$) derived from an exhaust gas and nitrogen oxides generated in the process of decomposing ammonia.

In the exhaust gas treatment catalyst according to the present invention, the porous catalyst base material serves as a DeNO$_x$ catalyst. Since it decomposes unreacted ammonia while decomposing nitrogen oxides (NO$_x$) generated in the process of decomposing ammonia, it does not suffer deterioration in denitration efficiency.

Coating Layer Containing Titania Having Platinum Supported Thereon

In the exhaust gas treatment catalyst according to the present invention, a coating layer is formed on the porous catalyst base material thus prepared. This coating layer contains titania having platinum supported thereon.

The coating layer can be formed as a single layer comprising titania having platinum supported thereon as an ammonia oxidation catalyst, and a DeNO$_x$ catalyst.

Preparation Process of an Exhaust Gas Treatment Catalyst Having a Coating Layer

The coating layer is prepared by preparing a catalyst slurry, applying it to the porous catalyst base material, and calcining the resulting material. The following is one examples of this process.

In one embodiment of this process, spherical titania (having diameter of 2 to 4 mm) is impregnated in an aqueous platinum solution such as an aqueous platinum chloride solution (H$_2$PtCl$_6$) to support from 0.05 to 0.1 wt. % of Pt on the spherical titania. After drying, the resulting titania is calcined at from 450 to 500° C. for 3 to 5 hours to obtain Powder catalyst 1. Water is added to the resulting Powdery catalyst 1, followed by wet ball-mill grinding to obtain Catalyst slurry 1 (ammonia oxidation catalyst slurry).

Similarly, water is added to Powder catalyst 2 obtained by mixing at least one compound selected from vanadium oxides, tungsten oxides, and molybdenum oxides and titanium oxide and grinding the resulting mixture in a wet ball mill to obtain Catalyst slurry (DeNO$_x$ catalyst slurry) 2. In this case it is preferred to mix the oxides at a V/W/Ti atomic ratio of (from 0.1 to 0.6)/(from 3 to 9)/(from 70 to 80) or at a V/Mo/Ti atomic ratio of (from 0.1 to 0.6)/(from 3 to 9)/(from 70 to 80).

Catalyst slurry 3 is prepared by mixing from 30 to 40 parts by weight of Catalyst slurry 1 and from 60 to 70 parts by weight of Catalyst slurry 2, each adjusted to an equal slurry concentration.

A porous catalyst base material, for example, a porous honeycomb catalyst base material is impregnated in Catalyst slurry 3. After drying the resulting catalyst, it is calcined at from 450 to 500° C. for from 3 to 5 hours. Catalyst slurry 3 is applied to the surface of the base material in an amount of from 85 to 115 g (thickness of the coating layer is from 85 to 115 μm) per m$^2$ of the surface area of the base material. The bifunctional catalyst thus obtained is an exhaust gas treatment catalyst having, on the porous catalyst base material thereof, a coating layer composed of a single layer containing titania having platinum supported thereon, that is, an ammonia oxidation catalyst and a DeNO$_x$ catalyst.

When the coating layer is made of a single layer as described above, it is preferred to isolate the platinum from vanadium oxides in order to improve the catalytic activity of platinum upon oxidation of ammonia.

The exhaust gas treatment catalyst according to the present invention functions to catalytically remove nitrogen oxides from the exhaust gas by using ammonia as a reducing agent while said catalyst also decomposes and removes unreacted ammonia. In short, it undergoes a denitration reaction and oxidative decomposition of ammonia as described below.

Denitration Reaction $$NO+NH_3+¼O_2=N_2+3/2H_2O \quad (1)$$

Oxidative Decomposition Reaction of Ammonia $$NH_3+¾O_2=½N_2+3/2H_2O \quad (2)$$

$$NH_3+5/4O_2=NO+3/2H_2O \quad (3)$$

The exhaust gas treatment catalyst according to the present invention can be employed in an exhaust gas treatment system. Such an exhaust gas treatment system is an exhaust gas treatment system for catalytically removing nitrogen oxides from an exhaust gas by using ammonia as a reducing agent and at the same time, decomposing and removing unreacted ammonia. As a specific mode, an exhaust gas treatment system can be constructed by placing a DeNO$_x$ catalyst on the side upstream of a gas flow and then placing the exhaust gas treatment catalyst according to the present invention downstream of the DeNO$_x$ catalyst.

Such an exhaust gas treatment system has an advantage of reducing a leaked amount of NH$_3$ compared with that using only a DeNO$_x$ catalyst.

Example 1

Spherical titania (having a diameter of from 2 to 4 mm) was impregnated in an aqueous platinum chloride solution (H$_2$PtCl$_6$) to support 0.05 wt. % of platinum (Pt) on the spherical titania. After drying, the resulting titania was calcined at 500° C. for 5 hours to obtain Powder catalyst 1. Water was added to the resulting Powder catalyst (ammonia oxidation catalyst) 1, followed by grinding in a wet ball mill to obtain Catalyst slurry 1. Similarly, water was added to Powder catalyst (DeNO$_x$ catalyst) 2 composed of 0.6 part by weight of vanadium oxides, 9 parts by weight of tungsten oxides, and 80 parts by weight of titanium oxide and the resulting mixture was ground in a ball mill to obtain Catalyst slurry 2.

Catalyst slurry 3 was prepared by mixing 35 parts by weight of Catalyst slurry 1 and 65 parts by weight of Catalyst slurry 2, each slurry being adjusted to an equal slurry concentration. A porous honeycomb catalyst base material (functioning as a DeNO$_x$ catalyst) serving as a porous catalyst base material and composed of 0.6 part by weight of vanadium oxides, 9 parts by weight of tungsten oxides, and 80 parts by weight of titanium oxide was impregnated in Catalyst slurry 3. The resulting catalyst was dried and then calcined at 500° C. for 5 hours.

Catalyst slurry 3 was applied to the base material in an amount of 100 g (thickness of coating layer: about 100 μm) per m$^2$ of the surface area of the base material and the resulting honeycomb exhaust gas treatment catalyst was designated as Bifunctional catalyst 1.

Example 2

In a similar manner to that of Bifunctional catalyst 1 employed in Example 1 except a supported amount of platinum (Pt) was changed to 0.1 wt. %, Bifunctional Catalyst 2 was obtained.

Comparative Example 1

A TiO$_2$—V$_2$O$_5$—WO$_3$ DeNO$_x$ catalyst (a TiO$_2$:V$_2$O$_5$:WO$_3$ mass ratio=80:0.6:9) was prepared in the following manner.

To 3600 g of a metatitanic acid slurry (having a TiO$_2$ content of 30 mass %) was added aqueous ammonia having an NH$_3$ content of 25% to adjust the pH to 6.5. To the resulting mixture was added ammonium paratungstate powder to give a WO$_3$ content of 9 mass % and the resulting mixture was wet kneaded for 2 hours. The resulting mass was dried and then calcined at 550° C. for 5 hours to obtain powder composed of titanium oxide and tungsten oxide. To the resulting powder was added an aqueous solution of ammonium metavanadate to give a $V_2O_5$ content of 0.6 mass %. The resulting mixture was mixed fully, dried, and calcined at 450° C. for 4 hours to obtain Powder (A) composed of titanium oxide [$TiO_2$], vanadium oxide [$V_2O_5$], and tungsten oxide [$WO_3$]. A kneader was charged with 1000 g of Powder (A), 25 g of carboxymethyl cellulose, and 12.5 g of polyethylene oxide. An adequate amount of water was added to the resulting mixture, followed by kneading for 30 minutes. The resulting kneaded mass was extruded to a 50 mm² sheet and the sheet was dried and then calcined at 500° C. for 5 hours.

Comparative Example 2

In a similar manner to that employed in Example 1 except for the use of an aqueous palladium chloride solution instead of the aqueous platinum chloride solution ($H_2PtCl_6$), a catalyst was prepared.

Performance test was performed using Bifunctional catalysts 1, 2 and 5 and the $DeNO_x$ catalyst.

The performance test was performed under the following conditions.

Exhaust gas temperature: 380° C.
Exhaust gas flow rate: 2.3 Nm/sec
$NO_x$ concentration: 500 ppm
The results were shown in Table 1.

TABLE 1

| | | | Catalyst performance | |
| --- | --- | --- | --- | --- |
| | Catalyst | Temperature (° C.) | Denitration efficiency (%) | Concentration of leaked $NH_3$ (ppm) |
| Example 1 | Bifunctional catalyst 1 | 380 | 95 | 2 |
| Example 2 | Bifunctional catalyst 2 | 380 | 95 | 3 |
| Comp. Ex. 1 | $DeNO_x$ catalyst | 380 | 95 | 8 |
| Comp. Ex. 2 | Bifunctional catalyst 5 | 380 | 95 | 8 |

Use of the exhaust gas treatment catalyst according to the present invention enabled to reduce the concentration of leaked ammonia while maintaining the denitration efficiency at 95% and also enabled to decrease the thickness of the coating layer.

The invention claimed is:

1. An exhaust gas treatment catalyst capable of catalytically removing nitrogen oxides from an exhaust gas by using ammonia as a reducing agent while decomposing and removing unreacted ammonia, the exhaust gas treatment catalyst comprising:
   a porous catalyst base material comprising titania and at least one compound selected from the group consisting of oxides of vanadium (V), oxides of tungsten (W) and oxides of molybdenum (Mo); and
   a coating layer formed at a surface of the porous catalyst base material, said coating layer comprising platinum supported on titania;
   wherein the exhaust gas catalyst is obtained by a first catalyst slurry mixture comprising the platinum supported on titania with a second catalyst slurry prepared from titania and at least one compound selected from oxides of vanadium (V), oxides of tungsten (W) and oxides of molybdenum (Mo) to form a slurry mixture; and applying the slurry mixture to the surface of the porous catalyst base material.

2. The exhaust gas treatment catalyst according to claim 1, wherein the coating layer comprising the platinum in an amount of from 0.05 to 0.1 wt. % based on a total amount of the titania and platinum (Pt) comprised by the coating layer.

3. An exhaust gas treatment system capable of catalytically removing nitrogen oxides from an exhaust gas by using ammonia as a reducing agent while decomposing and removing unreacted ammonia, wherein a $DeNO_x$ catalyst is disposed upstream a gas flow and the exhaust gas treatment catalyst as claimed in claim 2 is disposed downstream the $DeNO_x$ catalyst.

4. The exhaust gas treatment catalyst according to claim 1, wherein the coating layer has a thickness of from 100 to 300 μm.

5. An exhaust gas treatment system capable of catalytically removing nitrogen oxides from an exhaust gas by using ammonia as a reducing agent while decomposing and removing unreacted ammonia, wherein a $DeNO_x$ catalyst is disposed upstream a gas flow and the exhaust gas treatment catalyst as claimed in claim 4 is disposed downstream the $DeNO_x$ catalyst.

6. An exhaust gas treatment system capable of catalytically removing nitrogen oxides from an exhaust gas by using ammonia as a reducing agent while decomposing and removing unreacted ammonia, wherein a $DeNO_x$ catalyst is disposed upstream a gas flow and the exhaust gas treatment catalyst as claimed in claim 1 is disposed downstream the $DeNO_x$ catalyst.

7. The exhaust gas treatment catalyst according to claim 1, wherein the coating layer comprising the platinum in an amount of from 0.05 to 0.1 wt. % based on a total amount of the titania and platinum (Pt) comprised by the coating layer.

8. An exhaust gas treatment system capable of catalytically removing nitrogen oxides from an exhaust gas by using ammonia as a reducing agent while decomposing and removing unreacted ammonia, wherein a $DeNO_x$ catalyst is disposed upstream a gas flow and the exhaust gas treatment catalyst as claimed in claim 1, is disposed downstream the $DeNO_x$ catalyst.

9. The exhaust gas treatment catalyst according to claim 1, wherein the porous catalyst base material is a porous honeycomb catalyst base material.

10. The exhaust gas treatment catalyst according to claim 1, wherein the porous catalyst base material has a pore volume of 0.25 to 0.40 g/cc.

11. The exhaust gas treatment catalyst according to claim 1, wherein the coating layer is a single layer and wherein the platinum is isolated from vanadium (V) oxide.

12. The exhaust gas treatment catalyst according to claim 1, wherein the oxides of the porous catalyst base material comprises vanadium oxide and tungsten oxide.

13. The exhaust gas treatment catalyst according to claim 12, wherein the oxides of the porous catalyst base material has an atomic ratio of 0.1 to 0.6 for vanadium oxide, 3 to 9 for tungsten oxide and 70 to 80 for titania.

14. The exhaust gas treatment catalyst according to claim 1, wherein the oxides of the porous catalyst base material comprises vanadium oxide and molybdenum oxide.

15. The exhaust gas treatment catalyst according to claim 14, wherein the oxides of the porous catalyst base material has an atomic ratio of 0.1 to 0.6 for vanadium oxide, 3 to 9 for molybdenum oxide and 70 to 80 for titania.

16. A method of making the exhaust gas treatment catalyst according to claim 1, said method comprises:

impregnating in an aqueous platinum solution spherical titania having a diameter of 2 to 4 mm; then drying said aqueous platinum solution; followed by calcinating at 450 to 500° C. for 3 to 5 hours to obtain a powder catalyst 1; then adding water to the powder catalyst 1 followed by wet ball-mill grinding to obtain a catalyst slurry 1;

mixing to obtain a mixture of oxides comprising titania and at least one compound selected from the group consisting of oxides of vanadium (V), oxides of tungsten (W), and oxides of molybdenum (Mo); then grinding the mixture of oxides in a wet ball mill to obtain a powder catalyst 2;

adding water to the powder catalyst 2 to obtain a catalyst slurry 2; and then mixing 30 to 40 parts by weight of the catalyst slurry 1 with 60 to 70 parts by weight of the catalyst slurry 2 to form a catalyst slurry 3;

wherein the catalyst slurry 3 is applied to a surface of a porous catalyst base material, dried and then calcinated at 450 to 500° C. for 3 to 5 hours.

* * * * *